Jan. 15, 1952     C. A. CORNELL     2,582,770
TUBE PATCH
Filed June 23, 1949

INVENTOR.
Charles A. Cornell.
BY
ATTORNEYS

Patented Jan. 15, 1952

2,582,770

UNITED STATES PATENT OFFICE 2,582,770

TUBE PATCH

Charles A. Cornell, Johnstown, Ohio

Application June 23, 1949, Serial No. 100,789

1 Claim. (Cl. 152—367)

My invention relates to a tube patch. It has to do, more particularly, with a rubber patch for use in repairing rubber tubes of the pneumatic type commonly used in automobile and truck tires.

There are two types of patches for repairing tubes now commonly in use. One type is the "cold" patch which consists of three plies of cured rubber cut to size with a thick abrupt edge which is cemented to the tube. The other type is the "hot" patch which is made of uncured vulcanizable rubber and is affixed to the tube by a vulcanizing process which employs a vulcanizing device that develops heat and pressure to cure or vulcanize the rubber patch in place on the tube. The "cold" patch or cemented patch is not satisfactory because the heavy and thick edge does not stretch sufficiently with the tube wall and such patch has a tendency to loosen under high road temperature. Also, the prior art "cold" patch does not have sufficient tensile strength to hold large injuries. The "hot" or vulcanized patch to be secured to the tube effectively must be vulcanized at a proper temperature and pressure and this is difficult to obtain and maintain with tube vulcanizers since they vary greatly in pressure and temperature. Also with such "hot" patches it is necessary to further reinforce the larger injuries which requires considerable effort and time.

It is the main object of my invention to provide a tube patch which is of such a nature that it can be used as a "cold" patch or as a "hot" patch. When used as a cold patch it can be merely cemented in place and the heat developed in the tire, upon subsequent use of the repaired tube, will cause self-vulcanizing of the patch to the tube. When used as a "hot" patch, it can be more easily vulcanized with its edge more effectively attached to the tube and this can be done without the use of pressure.

According to my invention, I provide a tube patch which can be used two ways, that is, as a "cold" patch or as a "hot" patch. The patch is made in laminated form, with the body layer being formed of cured or vulcanized rubber stock and with an attaching layer of uncured or unvulcanized cushion stock which will contact the tube.

The body is made of high tensile plastic rubber stock which is of such a nature that it flows extremely easy which makes it possible to use extremely heavy stock. This stock has a plasticity in the order of Mooney plasticity, maximum —30. Because of the desirable flowability of the body stock, the body layer can be made of heavy stock and can still be so formed that it has a thin graduated or feather edge and a heavy central section. The thin graduated edge will adhere better to the tube and will stand more strain and pulling than an abrupt heavy edge, characteristic of the prior art, and which would pull loose from the tube since it cannot stretch with the flexible tube material. However, since the central section of the body layer will be heavy, it need not be reinforced, even when used on a thick truck tube, being tough and heavy enough to withstand the sharp edges of the injury and take the strain of the heavy tube stock. The heavy body layer reduces stretch over the injury and since it is cured and preformed will not lose its shape.

In forming the body layer, due to its plastic nature, it can be formed in a press, which has a flexible pressing member at one side of the body, so that its edge is permitted to flow outwardly in all directions. This permits development of an edge which is extremely thin and flexible and which graduates from the thicker center section to a feather edge of infinitesimal thickness. Such an edge cannot be produced with the relatively stiff stock used heretofore in patches and cannot be produced by forming the body in the usual mold cavity which would prevent the development of maximum flow of the edge. In practice, for example, in forming one type of patch I use plastic rubber stock of $\frac{3}{32}$ in. thickness and the edge flows in all directions to an extent of $\frac{1}{4}$ to $\frac{5}{8}$ in. to form the feather edge.

The other or attaching layer, which will contact and adhere to the tube, is a quick cure cushion stock which will vulcanize easily and effectively without pressure. If the patch is used as a "cold" patch this material will adhere to the tube until the heat developed in the tire during use of the tube vulcanizes the uncured cushion stock to the tube. In other words, the patch will be self-vulcanizing. On the other hand, the patch can be immediately vulcanized to the tube without pressure.

Thus, the patch is usable as a "cold" patch when it will be self-vulcanizable upon use or it can be used as a "hot" patch and be vulcanized immediately with heat but without pressure and still more effectively than prior art "hot" patches.

The preferred embodiment of my invention is illustrated in the accompanying drawing wherein similar characters of reference designate corresponding parts and wherein.

Figure 10:
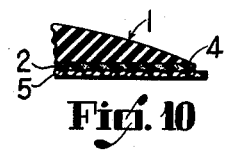
Figure 10 is an enlarged or exaggerated sectional view through the edge portion of the patch.
Figure 11:
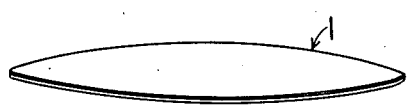
Figure 11 is a perspective view of the completed patch.
Figure 12:
Figure 12 is an enlarged side elevational view of the patch.

With reference to the drawing, the completed patch is illustrated in Figures 10 to 12. As previously indicated, it is a laminated patch consisting of the body layer 1 and the attaching layer 2 which are secured together. The patch illustrated is of circular or disc shape but it may be of any desired shape or size. It will be noted that the patch has a relatively thick or heavy center section 3 and an outer edge which tapers to a very thin or feather edge 4. Thus, the center section of the patch will be relatively stiff while the outer edge will be very flexible.

The laminated patch consists mainly of the body layer 1 and attaching layer 2, but the lower surface of the layer 2 is preferably protected with a layer of Holland cloth 5 which can be easily stripped therefrom when the patch is to be used, it being understood that the exposed lower surface of layer 2 will contact with the tube to be repaired with the patch. The body 1 is of cured plastic rubber stock while the layer 2 is of quick-cure but uncured cushion stock.

The body 1 is formed of a relatively thick section of high tensile rubber body stock which is characterized by its extreme flowability. This material is usually called plastic gum, or plastic rubber. It has a modulation of plasticity of Mooney maximum —30. (See The Vanderbilt 1948 Rubber Handbook published by R. T. Vanderbilt Company, 230 Park Avenue, New York city, which discusses Mooney plasticity.) It will cure at a temperature of from 280 to 306 degrees Fahrenheit to a durometer hardness of between 35 to 45. This body layer 1 is cured before the layer 2 is applied thereto.

The layer 2 is formed of quick cure cushion stock which will cure quickly at a temperature of from 280 to 306 degrees without pressure. At 283°, the stock will cure in five minutes or it will cure or vulcanize within one week to two weeks when on a repaired tube in a tire casing that is used at average car speeds and average temperatures.

Figure 1:
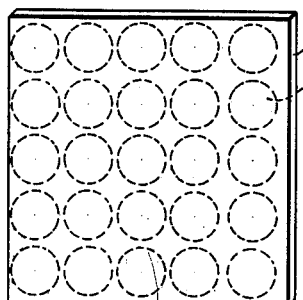
Figure 1 is a perspective view of a sheet of uncured plastic rubber stock used in forming the body of my patch.
Figure 2:
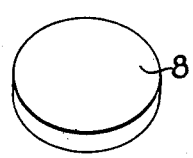
Figure 2 is a perspective view of a body blank or disc cut from the sheet of Figure 1.
Figure 3:
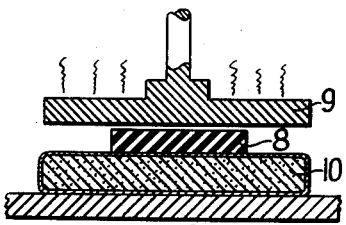
Figure 3 shows the body disc positioned in a press preparatory to pressing and curing.
Figure 4:
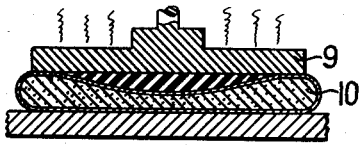
Figure 4 shows an intermediate stage of the pressing operation and how it causes the disc to flow and stretch.
Figure 5:
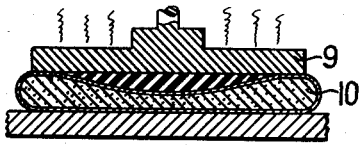
Figure 5 shows the final stage of the pressing operation with the disc completely stretched to provide a feather edge.
Figure 6:
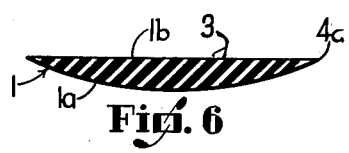
Figure 6 is a sectional view which illustrates the pressed and cured body layer.

In producing the patch, the steps indicated in Figures 1 to 12 are preferably followed. A sheet 6 of the heavy body stock is selected. Then as indicated by dotted circles, discs 8 of proper size are punched therefrom. Each disc 8, as shown in Figure 2, will be relatively heavy being of a selected size to form a patch of selected size. The uncured disc 8 is then subjected to a pressing and curing operation, as shown in Figures 3 to 5. This operation takes place in a curing press which has a heated plunger 9 and a flexible bottom 10. Because the material of disc 8 will flow easily, the pressing operation causes the disc to spread out and due to the flexible bottom, a thin edge 4a will be formed on the disc and the disc will have a convex lower surface 1a. In practice, I have found that the edge of a disc $\frac{3}{32}$ in. thickness will flow from $\frac{1}{4}$ to $\frac{5}{8}$ in. to produce a graduated feather edge. The edge graduates from about $\frac{3}{32}$ in. to .001 in. The resulting body member 1 will appear as indicated in Figure 6 and will be in cured condition, it being understood that it is kept in the press at the necessary temperature for a sufficient period to cure it.

Next, a sheet 11 of suitable material to form the layer 2 is selected. This material is the quick cure cushion stock previously referred to and one of its surfaces is protected by Holland cloth 5.

Figure 7:
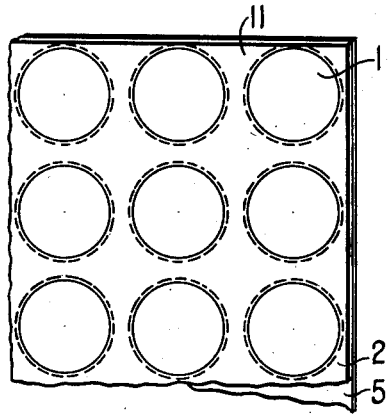
Figure 7 is a perspective view of a sheet of uncured quick cure cushion stock used in forming the attaching layer of the patch, showing a number of the body layers positioned thereon.
Figure 8:
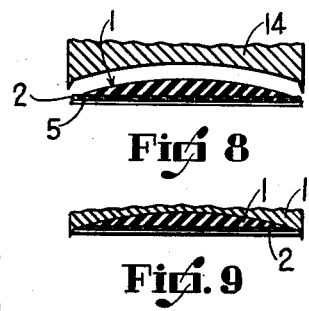
Figure 8 illustrates how each cemented body layer is positioned on the exposed side of the sheet of quick cure cushion stock of Figure 7 and is subjected to a pressing operation which simultaneously cuts the attaching layer from the sheet.
Figure 9:
Figure 9 is a similar view showing the two layers pressed together to form the completed patch.

Several of the bodies 1 are placed on the exposed upper surface of sheet 11, as shown in Figure 7, with the flat surface 1b of each in contact with the sheet. Preferably, the surface 1b is first provided with a coating of cushion gum cement. By a simultaneous pressing and cutting operation with a combination tool 14 shown in Figures 8 and 9, each body is pressed down on sheet 11 and a disc of about the same size as the body is cut therefrom forming the composite unit or patch of Figure 9, it being noted from Figures 8 and 9 that body 1 has its edge terminating within the edge of layer 2. Flat surface 1b will be pressed against sheet 11 and the convex surface 1a of body 1 will be exposed at one side of the patch. Thus, the patch is completed and can be used as previously indicated.

When the Holland cloth 5 is stripped from the lower surface of the patch, the exposed surface of layer 2 will be sufficiently tacky to adhere to the tube over the injury to be repaired. Layer 2 is so soft that when it is pressed to the tube at its edge it flows and further accentuates the feather edge of the patch. When positioned over the injury, layer 2 may be vulcanized to the tube by heat from a suitable source and without pressure, or the heat developed in the tire, in which the tube is employed, may be relied upon to vulcanize it.

The heavy center section 3 of the body layer 1 need not be reinforced in any way because it will be sufficiently tough to withstand the sharp edges of the injury and the strain of the heavy tube stock. It will have a minimum of stretch over the injury but will be extremely flexible at its edge which is a feather edge. Thus, it will prevent loosening of the patch on the tube. Since the body is cured and preformed, the patch will retain its shape both before and after being applied to the tube. Because the patch includes the uncured layer 2 of quick cure cushion stock, it can be used either as a "cold" patch or a "hot" patch.

Various other advantages will be apparent.

Having thus described my invention, what I claim is:

A tube patch comprising a heavy body layer formed of plastic rubber gum which in its uncured state has a maximum modulation of plasticity of Mooney −30, said body layer having been pressed and cured in a flexible press so that it has a flat face and a convexly curved opposed face so that it gradually decreases in thickness from its thick relatively rigid center in all directions to its edge to provide a highly flexible feather edge and said cured body layer having a durometer hardness of 35 to 45, and a relatively thin attaching layer secured to the flat face of said body layer in completely covering relationship thereto and consisting of quick-cure but uncured rubber gum which will cure at a temperature of from 280° to 306° F. without pressure in approximately five minutes or will self-cure when on a repaired tube in a tire casing in about one week at normal driving speeds and temperatures, said body having its flexible feather edge terminating within the edge of said attaching layer, and a protective covering layer on the outer surface of said attaching layer.

CHARLES A. CORNELL.

REFERENCES CITED

The following references are of record in the file of this patent:

UNITED STATES PATENTS

| Number | Name | Date |
|---|---|---|
| Re. 17,859 | Dunlap | Nov. 11, 1930 |
| Re. 17,860 | Gross | Nov. 11, 1930 |
| 581,235 | Kenyon | Apr. 20, 1897 |
| 604,636 | Reynolds | May 24, 1898 |
| 1,596,430 | Gross | Aug. 17, 1926 |
| 1,631,354 | Ayers | June 7, 1927 |
| 1,653,989 | Cooper | Dec. 27, 1927 |
| 2,148,079 | Martin | Feb. 21, 1939 |

FOREIGN PATENTS

| Number | Country | Date |
|---|---|---|
| 641,336 | France | Apr. 14, 1928 |
| 703,232 | France | Feb. 2, 1931 |